(12) United States Patent
Wetzig

(10) Patent No.: US 10,071,656 B2
(45) Date of Patent: Sep. 11, 2018

(54) SEAT BACK ADJUSTER AND VEHICLE SEAT HAVING A SEAT BACK ADJUSTER

(71) Applicant: Johnson Controls Components GmbH & Co. KG, Kaiserslautern (DE)

(72) Inventor: Stefan Wetzig, Ennepetal (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 62 days.

(21) Appl. No.: 15/113,930

(22) PCT Filed: Jan. 6, 2015

(86) PCT No.: PCT/EP2015/050100
§ 371 (c)(1),
(2) Date: Jul. 25, 2016

(87) PCT Pub. No.: WO2015/113784
PCT Pub. Date: Aug. 6, 2015

(65) Prior Publication Data
US 2016/0339809 A1    Nov. 24, 2016

(30) Foreign Application Priority Data

Jan. 31, 2014 (DE) .......... 10 2014 201 812
Apr. 16, 2014 (DE) .......... 10 2014 207 363

(51) Int. Cl.
*B60N 2/235* (2006.01)
*B60N 2/22* (2006.01)
(Continued)

(52) U.S. Cl.
CPC ............. *B60N 2/2213* (2013.01); *B60N 2/20* (2013.01); *B60N 2/22* (2013.01); *B60N 2/2227* (2013.01); *B60N 2/23* (2013.01); *B60N 2/2356* (2013.01)

(58) Field of Classification Search
CPC .... B60N 2/235; B60N 2/2352; B60N 2/2356; B60N 2/2354
(Continued)

(56) References Cited

U.S. PATENT DOCUMENTS 6,474,740 B1    11/2002 Kondo et al.
8,864,234 B2 *  10/2014 McCulloch .......... B60N 2/2358
                                                297/367 P
(Continued)

FOREIGN PATENT DOCUMENTS

CN      101636293 A    1/2010
CN      103079878 A    5/2013
(Continued)

OTHER PUBLICATIONS

International Search Report and Translation in PCT/EP2015/050100 dated Apr. 1, 2015, 6 pages.
(Continued)

*Primary Examiner* — Timothy J Brindley
(74) *Attorney, Agent, or Firm* — Foley & Lardner LLP

(57) ABSTRACT

A seat back adjuster for a vehicle seat, said seat back adjuster having at least a fitting upper part, a fitting lower part and a fitting arranged therebetween, wherein a separate adapter is arranged on a side of the fitting upper part or of the fitting lower part facing away from the fitting, said adapter being fixed on the fitting through an opening in the fitting upper part or in the fitting lower part, and wherein a control lever is provided which is arranged on the side of the adapter facing away from the fitting and is interlockingly and/or frictionally connected to the adapter.

9 Claims, 7 Drawing Sheets

(51) Int. Cl.
*B60N 2/20* (2006.01)
*B60N 2/23* (2006.01)

(58) Field of Classification Search
USPC .................................................. 297/362.12
See application file for complete search history.

(56) References Cited

U.S. PATENT DOCUMENTS

| | | | | |
|---|---|---|---|---|
| 9,216,668 B2* | 12/2015 | Teufel | .................. | B60N 2/2356 |
| 2013/0001997 A1* | 1/2013 | Gallienne | ............ | B60N 2/4435 |
| | | | | 297/354.12 |
| 2013/0134759 A1* | 5/2013 | Oki | ...................... | B60N 2/2213 |
| | | | | 297/362 |
| 2014/0110984 A1* | 4/2014 | Assmann | ................. | B60N 2/20 |
| | | | | 297/354.1 |
| 2014/0132053 A1 | 5/2014 | Schuler et al. | | |
| 2015/0306990 A1* | 10/2015 | Nakagawa | ........... | B60N 2/6009 |
| | | | | 297/452.1 |
| 2016/0001680 A1* | 1/2016 | Thiel | ........................ | B60N 2/20 |
| | | | | 297/366 |
| 2016/0023575 A1* | 1/2016 | Gallienne | ................ | B60N 2/20 |
| | | | | 297/362.12 |
| 2017/0021743 A1* | 1/2017 | Hiemstra | ............... | B60N 2/235 |

FOREIGN PATENT DOCUMENTS

| | | |
|---|---|---|
| DE | 10028119 A1 | 1/2001 |
| DE | 10 2005 040 629 A1 | 3/2007 |
| DE | 20 2011 106 338 U1 | 11/2011 |
| DE | 10 2010 025 112 A1 | 12/2011 |
| DE | 10 2011 010 700 A1 | 8/2012 |
| DE | 10 2012 006 227 A1 | 1/2013 |
| DE | 10 2012 010 402 B3 | 10/2013 |

OTHER PUBLICATIONS

Office Action dated Sep. 22, 2014, received in corresponding German application No. 10 2014 207 363.4, 5 pages.
Written Opinion of the International Searching Authority in PCT/EP2015/050100 dated Apr. 1, 2015, 5 pages.
Office Action dated Jun. 19, 2017, received in corresponding Chinese application No. 20158006466.5 (7 pages) and English translation (7 pages).

* cited by examiner

SEAT BACK ADJUSTER AND VEHICLE SEAT HAVING A SEAT BACK ADJUSTER

CROSS REFERENCE TO RELATED APPLICATIONS

The present application is a U.S. National Stage of International Application No. PCT/EP2015/050100 filed on Jan. 6, 2015, which claims the benefit of German Patent Application Nos. 10 2014 201 812.9 filed on Jan. 31, 2014 and 10 2014 207 363.4 filed on Apr. 16, 2014, the entire disclosures of all of which are incorporated herein by reference.

The invention relates to a backrest adjuster for adjusting a seat backrest of a vehicle seat and a vehicle seat having such a backrest adjuster.

Such a backrest adjuster is known with fittings for the manual or electrically operated adjustment of a seat backrest of a vehicle seat with or without an Easy Entry System and enables different comfort positions or positions for use of the seat backrest or facilitated entry into a rear region of a vehicle. The fitting can be actuated by means of an operating lever, in particular an unlocking lever, which may be arranged on the fitting itself or on a backrest of the vehicle seat, whereby the backrest of the vehicle seat is unlocked and can be pivoted into a comfort position or out of an entry region. If the vehicle seat is arranged on rails, the vehicle seat may further be able to be displaced from the entry region in the travel direction when the unlocking lever is actuated.

DE 10 2010 025 112 A1 describes a fitting for a vehicle seat, in particular a motor vehicle seat, having a first fitting member and a second fitting member which can be locked to each other and which can be rotated relative to each other about an axis, a transmission rod whose rotation unlocks the fitting, and a hand lever whose actuation to unlock the fitting rotates the transmission rod, wherein there is provided a stop module which is operationally connected, on the one hand, to the hand lever and, on the other hand, to the transmission rod and which in at least one rotation direction brings the hand lever and one of the fitting members into a stop state relative to each other.

DE 100 28 119 A1 discloses a seat adjustment device for a vehicle with a lower arm which is provided to be securely arranged on a seat cushion element, an upper arm which is rotatably arranged with the lower arm and which is provided to be secured to a seat backrest element, a locking mechanism for locking the upper arm relative to the lower arm, wherein the locking mechanism has a rotatable cam and a spring which is arranged between the lower arm and the cam in order to apply a pretensioning force to the cam, wherein the spring is arranged in such a manner that it winds around the rotation axis of the cam.

DE 10 2012 010 402 B3 describes a fitting for a vehicle seat having a first fitting member and a second fitting member, which can be rotated relative to each other about an axis, wherein a toothed ring is formed on the first fitting member and guiding segments are formed on the second fitting member, and having bars which can be radially displaced in a guided manner by means of the guiding segments between a locked state and an unlocked state and which in the locked state cooperate with the toothed ring in order to lock the fitting, and having a resiliently loaded, rotatably supported eccentric which acts on the bars in order to make them cooperate with the toothed ring and having a rotatably supported carrier for rotating the eccentric and an indicator which is connected to the carrier in a rotationally secure manner, a sensor which is connected to the fitting detects a position change of the indicator and converts this into an electrical output signal.

An object of the present invention is to provide an improved backrest adjuster having a fitting for adjusting a seat backrest and a vehicle seat having an improved backrest adjuster.

The object is achieved according to the invention with respect to the backrest adjuster as described further herein. With regard to the vehicle seat, the object is achieved according to the invention as described further herein.

The backrest adjuster has an upper fitting member, a lower fitting member and a fitting which is arranged therebetween, in particular a rotary and/or catch fitting for adjusting a seat backrest, wherein the upper fitting member is secured to the backrest and the lower fitting member is secured to a seat-side or bodywork-side substructure. In this instance, there is arranged at each of the two sides of the vehicle seat such a fitting having an upper fitting member and a lower fitting member. The two fittings are rotatably connected to each other by means of a transmission rod. In order to return the seat backrest to the original position thereof, in particular into a seat or starting position, the backrest adjuster comprises at least one restoring spring which is arranged in particular at the inner side on the upper fitting member.

The respective fitting which is constructed as a rotary and/or catch fitting serves to adjust the inclination and/or to freely pivot the seat backrest. In particular, the respective fitting can be configured to position the seat backrest in different seating or comfort positions and/or in an easy-entry position, for integrated comfort locking for positioning the seat backrest in at least one comfort or seat position.

At least one of the fittings is connected in a rotationally secure manner at the outer side, in particular at the side facing away from the transmission rod and the second fitting, to an operating lever by means of an adapter. The adapter is arranged in a rotationally secure manner on the fitting, in particular on a carrier or on a securing ring or on a disc of the fitting, and arranged in a rotationally secure manner on the operating lever.

To this end, the adapter and the operating lever have mutually corresponding profiles or structures which in particular engage one inside the other, in particular ribs which protrude at the surface side, webs and/or sets of teeth. The adapter and the fitting are connected to each other in a rotationally secure manner by means of a releasable connection, in particular a snap-fitting and/or catch connection. In addition, the adapter and the transmission rod are releasably connected to each other, in particular by means of a snap-fitting and/or plug type and/or catch connection.

In addition to the in particular axially protruding rib, tooth and/or web-like profiles/structures for rotationally secure connection of the adapter and operating lever, the adapter has at least one or two or more than two radially protruding stops, for example, in the form of circle-segment-like lugs or extensions in which one or more corresponding fitting-side stop elements, for example, in the form or one or more flaps, of the fitting which is secured to the seat member engage in order to limit the rotation of the adapter and consequently the rotation of the operating lever relative to the seat member.

The adapter can be returned to a starting position by means of an associated restoring element, in particular regardless of the locking state of the fitting. Consequently, the fitting is rotatably engaged by means of the adapter with the operating lever for unlocking or locking, wherein a pivot region of the operating lever is delimited by means of a flap of the fitting, which flap engages in the adapter, and a stop of the adapter corresponding to this flap.

A backrest adjuster according to the invention for a vehicle seat comprises at least an upper fitting member, a lower fitting member and a fitting which is arranged therebetween, wherein at a side of the upper fitting member or the lower fitting member facing away from the fitting, there is arranged a separate adapter which is fixed to the fitting by means of a recess in the upper fitting member or in the lower fitting member, and wherein there is provided an operating lever which is arranged on the adapter in a form-fitting and/or force-fitting manner at the side of the adapter facing away from the fitting.

To this end, there is provision in a development of the invention for the adapter to have at least one radially protruding stop in which at least one corresponding fitting-side stop element of the fitting engages. The adapter is thereby connected in a rotationally secure manner to the fitting.

The adapter with the radially protruding and integrated stop consequently has with respect to conventional separate stops an increased contact and force-absorbing face, whereby, in the event of excessively large mechanical loading, for example, in the event of misuse during actuation, it can absorb relatively large torques, for example, of more than 50 Nm, in particular of 70 Nm.

According to a development of the invention, the adapter and the operating lever have mutually corresponding profiles which in particular engage one inside the other and which are connected to each other in a rotationally secure manner. The adapter and the operating lever are additionally connected to each other in a rotationally secure manner by a securing means. Consequently, in the event of an actuation of the operating lever for backrest adjustment, the unlocking mechanism of the fitting is actuated.

The invention is further constituted in that the profiles are constructed as ribs, webs and/or sets of teeth which protrude at the surface side. The rotational strength is thereby formed between the adapter and the operating lever.

Another embodiment of the backrest adjuster makes provision for the adapter and the operating lever to each have at least one securing element which is constructed as a snap-fitting and/or plug type and/or catch connection. Consequently, the two elements are connected to each other in a form-fitting manner.

A development of the invention makes provision for the adapter and the transmission rod to be releasably connected to each other. The two elements can thereby be assembled and/or disassembled in a simple manner.

Furthermore, a construction variant of the backrest adjuster makes provision for the adapter to be connected to the fitting in a form-fitting and rotationally secure manner, in particular by means of a snap-fitting and/or plug type and/or catch connection. The unlocking mechanism of the backrest adjuster is thereby enabled by the actuation lever.

Another embodiment of the backrest adjuster sets out that there is provided a restoring element which is constructed as a resilient element having a first resilient end, which is connected to the adapter, and having a second resilient end which is connected to the fitting. Consequently, between the adapter and the fitting, after the actuation of the operating lever, the same starting position is always assumed independently.

In a development of the invention, there is provided a second fitting element comprising an upper fitting member, a lower fitting member and a fitting which is arranged therebetween and which is releasably and rotatably connected to the fitting by means of a transmission rod. A simultaneous unlocking of the locking mechanism is thereby enabled by means of an actuation lever.

An embodiment of the invention makes provision for the fitting to be constructed as a rotary and/or catch fitting. Consequently, different comfort positions or positions for use of the seat backrest or facilitated entry into a rear region of a vehicle are possible.

Embodiments of the invention are explained in greater detail below with reference to schematic Figures, in which:

FIG. 1 is a schematic exploded illustration of an embodiment of a backrest adjuster for a vehicle seat which is not illustrated in greater detail, FIG. 2 is a schematic view of the backrest adjuster in the assembled state with the adapter, operating lever and securing means, FIG. 3 is a schematic, perspective view from the inner side of an operating lever, which is arranged at the outer side on an adapter according to FIG. 4, FIGS. 4A, 4B are schematic, perspective views from the outer side of two embodiments of an adapter which is arranged at the outer side on a fitting of the backrest adjuster, FIG. 5 is a schematic plan view from the outer side of the adapter according to FIG. 4B, FIG. 6 is a schematic plan view from the inner side of the adapter according to FIG. 4B, FIG. 7 is a schematic view of an embodiment of an assembled backrest adjuster as a top view of the operating lever, FIG. 8 is a schematic view of an embodiment of an assembled backrest adjuster as a top view at the lever side without any operating lever or securing means, and FIG. 9 is a schematic enlarged illustration of a seat-member-side stop element and a corresponding adapter-side stop.

Components which correspond to each other are given the same reference numerals in all the Figures.

FIG. 1 is a schematic illustration of a manually actuatable backrest adjuster 1 for a vehicle seat which is not illustrated in greater detail.

The vehicle seat which is not illustrated in greater detail generally comprises a seat member and a seat backrest which can be pivotably arranged thereon as seat components.

The backrest adjuster 1 comprises at both outer sides two fittings 2 which are constructed as rotary or catch fittings for releasable locking and inclination adjustment and where applicable free pivoting of the seat backrest relative to the seat member. The two fittings 2 are rotatably connected to each other by means of a transmission rod 3.

In order to unlock the fitting 2 and to adjust the inclination of the seat backrest relative to the seat member, the backrest adjuster 1 comprises an operating lever 4 which is arranged at the outer side on one of the fitting sides of the backrest adjuster 1 on one of the fittings 2 by means of an adapter 5 and unlocks the respective fitting 2 and thereby drives the transmission rod 3 and consequently unlocks and drives the opposing fitting 2.

At each of the two sides of the vehicle seat, a first fitting member B1 and a second fitting member B2 are arranged, respectively. Between the fitting members B1 and B2, one of the fittings 2 is arranged at each outer side of the vehicle seat. The first fitting member B1 is, for example, securely connected to the structure of the seat backrest and consequently fixed to the backrest (also referred to as the upper fitting member or fitting member which is fixed to the backrest). The second fitting member B2 is securely connected to the structure of the seat member and consequently fixed to the seat member (also referred to as the lower fitting member or fitting member which is fixed to the seat member). The associations of the fitting members B1 and B2 may also be transposed, that is to say, the first fitting member B1 is fixed to the seat member and the second fitting member B2 is fixed to the backrest.

For actuation, in particular locking and unlocking of the fitting 2, the operating lever 4 is secured to the adapter 5 in a form-fitting and/or force-fitting manner at one of the outer sides of the vehicle seat by means of a securing means 6, in particular a screw, such as a plastics material screw.

In this instance, the operating lever 4 is constructed in such a manner that, when actuated by means of the adapter 5, it rotates the transmission rod 3 so that the fitting 2 arranged at the same outer side and the fitting 2 arranged at the opposing outer side of the vehicle seat are actuated and thereby optionally opened.

The operating lever 4 comprises a lever element 4.1. The lever element 4.1 can be adjusted between a first position in which the fitting 2 is locked and a second position in which the fitting 2 is open.

As a result of the opened fittings 2 of the seat backrest in the second position of the lever element 4.1, the seat backrest can be manually pivoted. If the lever element 4.1 is in the first position, the fittings 2 are locked and the seat backrest is secured in a correspondingly manually adjusted position.

The backrest adjuster 1 further comprises a stop element 7 which is part of the seat-member-side or bodywork-side fitting member B2 or is securely connected to this fitting member B2, for example, welded. The stop element 7 is constructed in the form of a flap which protrudes from the second fitting member B2. In this instance, the stop element 7 protrudes from the second fitting member B2 in the direction of the adapter 5. The stop element 7 additionally serves to limit the pivoting of the operating lever 4.

The adapter 5 is connected to the transmission rod 3 in a rotationally secure manner so that the rotational movement of the operating lever 4 is transmitted via the adapter 5 and thereby to the transmission rod 3 and the opposing fitting 2.

In this instance, the adapter 5 and the operating lever 4 have mutually corresponding profiles or structures which in particular engage one inside the other, in particular ribs, webs and/or sets of teeth which protrude at the surface side. The adapter 5 and the fitting 2 are connected to each other in a rotationally secure manner by means of a releasable connection, in particular a snap-fitting and/or plug type and/or catch connection. In addition, the adapter 5 and the transmission rod 3 are connected to each other in a releasable form-fitting manner, in particular by means of a snap-fitting and/or plug type and/or catch connection.

In addition to the in particular axially protruding rib, tooth and/or web-like profiles/structures for rotationally secure connection of the adapter 5 and operating lever 4, the adapter 5 may have at least one or two radially protruding stops 10, for example, in the form of circle-segment-like lugs or extensions in which one or more corresponding fitting-side stop elements 7, for example, in the form of one or more flaps, of the fitting member B2 which is fixed to the seat member engage in order to limit the rotation of the adapter 5 and consequently the rotation of the operating lever 4 relative to the seat member.

In one possible embodiment, as illustrated in FIGS. 1 and 2, the backrest adjuster 1 comprises one restoring spring 8 for each fitting 2. The two restoring springs 8 are articulated at the upper side of the fitting (fixed to the backrest) and at the lower side of the fitting (fixed to the seat member or bodywork) in such a manner and configured in such a manner that they act in the travel direction when the fittings 2 are open and the pivotable seat backrest can be placed in a folded or floor-like position.

For example, there are provided according to the embodiment according to FIGS. 1 and 2 a retention member 8.1 which is fixed to the backrest as an articulation location for one end of the resilient element 8 and as a support, and a retention member 8.2 which is at the lower side of the fitting and which is, for example, arranged in a materially engaging manner, as an opposing articulation location for the other end of the resilient element 8.

Furthermore, a limit stop 11 is provided to limit the adjustment path of the first fitting member B1 when the inclination of the seat backrest of the seat is adjusted. In this instance, the second fitting member B2 has counter-stops 12 corresponding to the limit stop 11.

Furthermore, the backrest adjuster 1 comprises for the adapter 5 an associated restoring element 9, in particular a spring. The restoring element 9, in particular independently of the locking state of the lever-side fitting 2, returns the adapter 5 to the original position thereof, whereby the lever-side fitting 2 is locked in a rattle-free state.

FIG. 3 is a perspective view of an inner side of the operating lever 4 facing the adapter 5.

The operating lever 4 has two regions, wherein there is arranged in a first region the lever axis about which the operating lever 4 can carry out a pivot movement. This first region is substantially circular. The lever axis is located in the center of the first region in the through-opening which is illustrated in the present embodiment and through which the transmission rod 3 is arranged in the assembled state of the backrest adjuster 1. A second region is formed by means of the lever element 4.1 described above.

The inner side of the operating lever 4 has a first formation 4.2 which surrounds the through-opening of the operating lever 4 with a specific spacing and which protrudes axially in the direction of the adapter 5 from the inner side and which has a recess 4.2.1. The recess 4.2.1 is in this instance connected to the through-opening and substantially has a star-like, crown-like, toothed-ring-like or thorax-like (for example, rib-like) profile. That is to say, the profile has in a state distributed over the periphery a number of recesses and a number of projections, wherein at least one of the recesses in the present embodiment has increased dimensions with respect to the other recesses, in particular a larger diameter and/or a larger width/height/depth.

The recess 4.2.1 is in this instance constructed so as to correspond to a second formation 5.1 which is arranged on the adapter 5 for force-fitting and form-fitting connection of both formations 5.1, 4.2 and consequently the adapter 5 and operating lever 4.

On the first formation 4.2 there are arranged eight radially protruding ribs 4.3 which are spaced apart from each other in the peripheral direction and which engage in a force-fitting and form-fitting manner between axially protruding circle segments 5.2 which are arranged on the adapter 5, whereby a mechanical stability for absorbing torque when the operating lever 4 is pivoted on the adapter 5 is ensured. In a version which is not illustrated in greater detail, the number of radially protruding ribs may be different.

The inner side of the operating lever 4 further has three first clip-fit elements 4.4 which are each arranged between two ribs 4.3.

FIGS. 4A and 4B are perspective views from the outer side of two embodiments of an adapter 5.

The adapter 5 has in both embodiments the second formation 5.1 described above and the circle segments 5.2, wherein the circle segments 5.2 are arranged around the second formation 5.1 and are substantially U-shaped. In addition, the adapter 5 has a number of second clip-fit elements 5.3 and a receiving element 5.4 which are illustrated in greater detail in FIG. 5.

For example, the receiving element 5.4 is constructed as a material accumulation in which the securing means 6, in particular a screw, is introduced in a form-fitting and/or force-fitting manner when the adapter 5 and operating lever 4 are assembled.

Alternatively, the receiving element 5.4 may be constructed as a clip-fit element in an embodiment which is not illustrated. In this instance, the securing means 6 is constructed as a catch connector or a similar element.

The second formation 5.1 has a shape which corresponds to the recess 4.2.1 which is arranged in the operating lever 4, in particular a star-like shape with a number of recesses and projections.

The recesses in a first embodiment which is shown in FIG. 4A are constructed so as to be flatter than in a second embodiment which is shown in FIG. 4B. The adapter 5 according to FIG. 4B with the deeper recesses provides space (as can be seen in FIG. 5 as a plan view) for a sliding member in order to be able to release the catch or snap-fitting connection and consequently the second clip-fit elements 5.3 (unclip).

FIG. 5 is a schematic plan view of the adapter 5 from the outer side according to FIG. 4B.

The second clip-fit elements 5.3 are arranged in each case between two projections of the second formation and are consequently spaced apart from each other in a peripheral direction. The second clip-fit elements 5.3 serve to connect in a rotationally secure manner, in particular axially connect, the adapter 5 and fitting 2.

The receiving element 5.4 is arranged at an inner periphery of a through-opening which is introduced in the second formation 5.1, which in the assembled state of the backrest adjuster 1 are arranged in alignment with the lever axis and are spaced apart from each other in the peripheral direction of the through-opening. The present embodiment has three receiving elements 5.4 (alternatively three third clip-fit elements). The receiving elements 5.4 or third clip-fit elements serve to connect the adapter 5 and the operating lever 4 in a form-fitting and/or force-fitting and rotationally secure manner.

Figure 8:
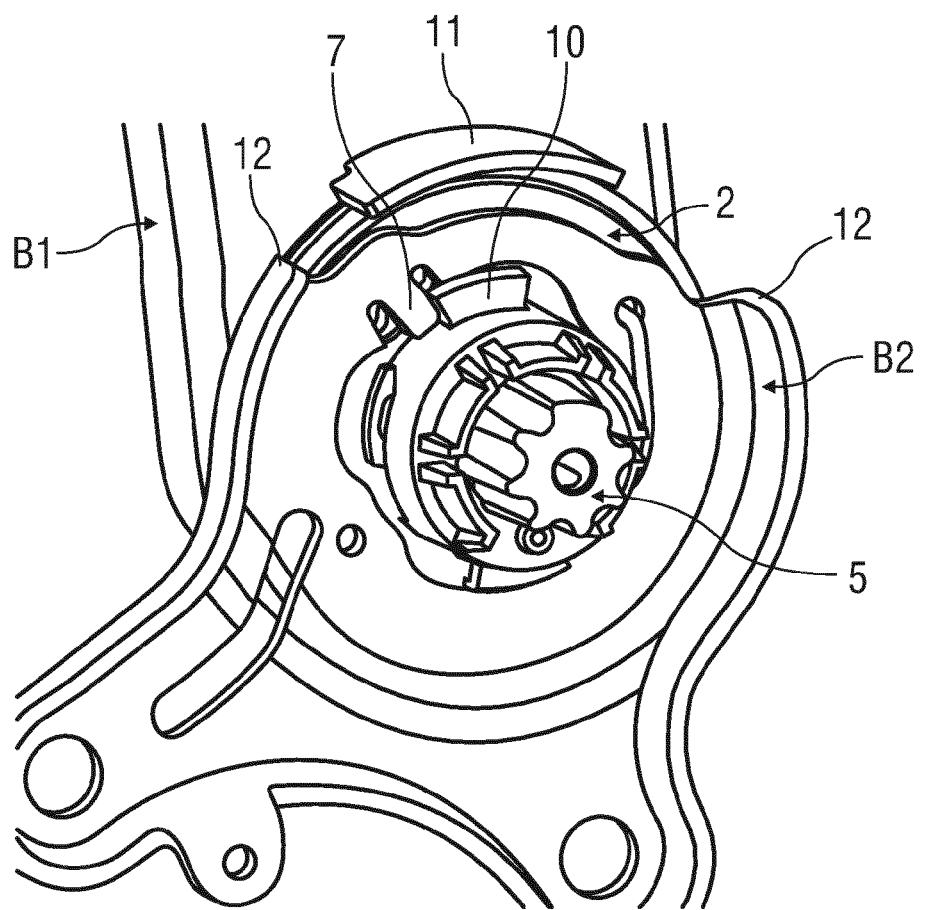

FIG. 8 is a view of an embodiment of an assembled backrest adjuster 1 as a top view on the lever side without the operating lever 4 with the seat-member-side flap-like stop element 7 and the corresponding adapter-side circle-segment-like stop 10.

Figure 9:
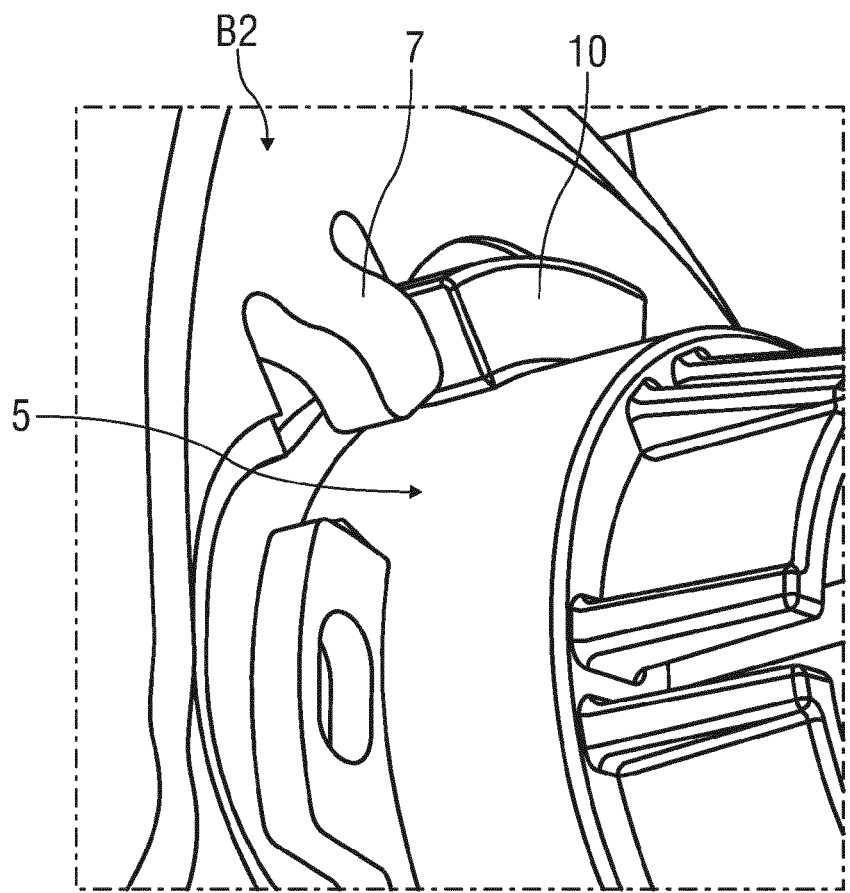

FIG. 9 is an enlarged illustration of the stop element 7 and the stop 10 which is constructed so as to correspond thereto.

The stops 10 which are arranged on the adapter 5 and which protrude radially therefrom have an increased contact and force-absorbing surface-area, whereby, in the event of excessively large mechanical loading, for example, in the event of misuse during actuation, it can absorb relatively large torques, for example, of more than 50 Nm, in particular of 70 Nm.

Figure 1:
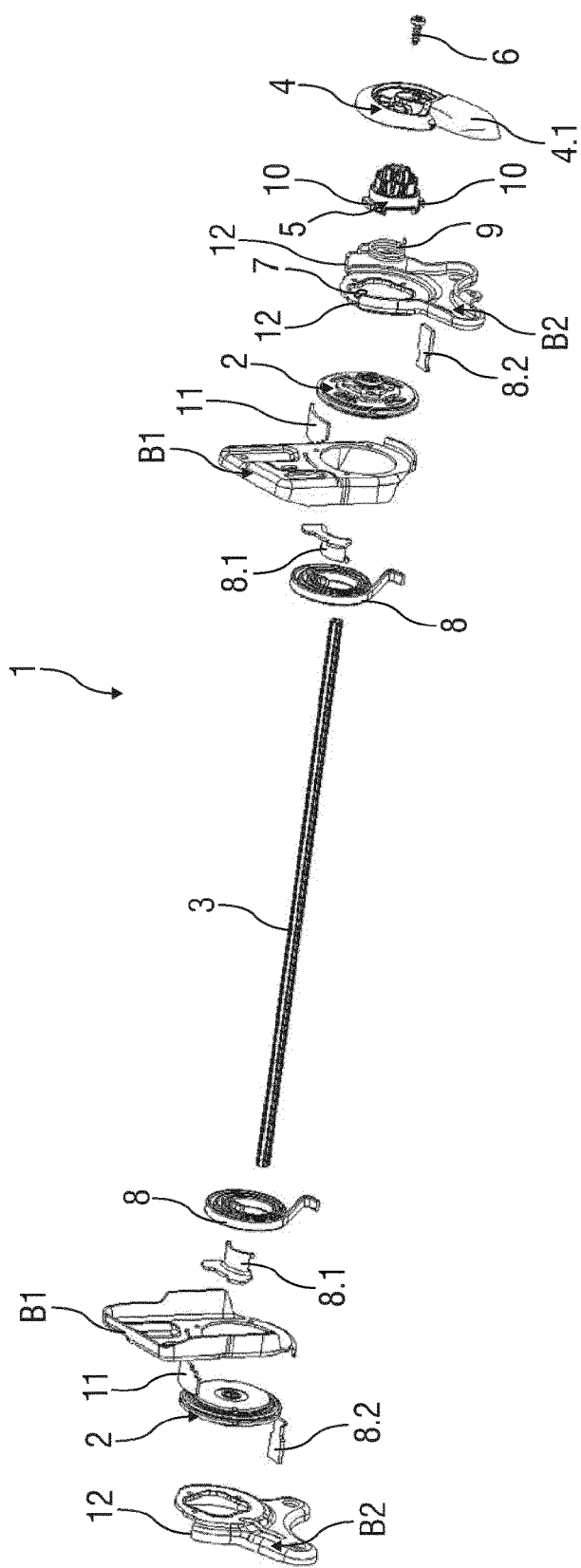
Figure 2:
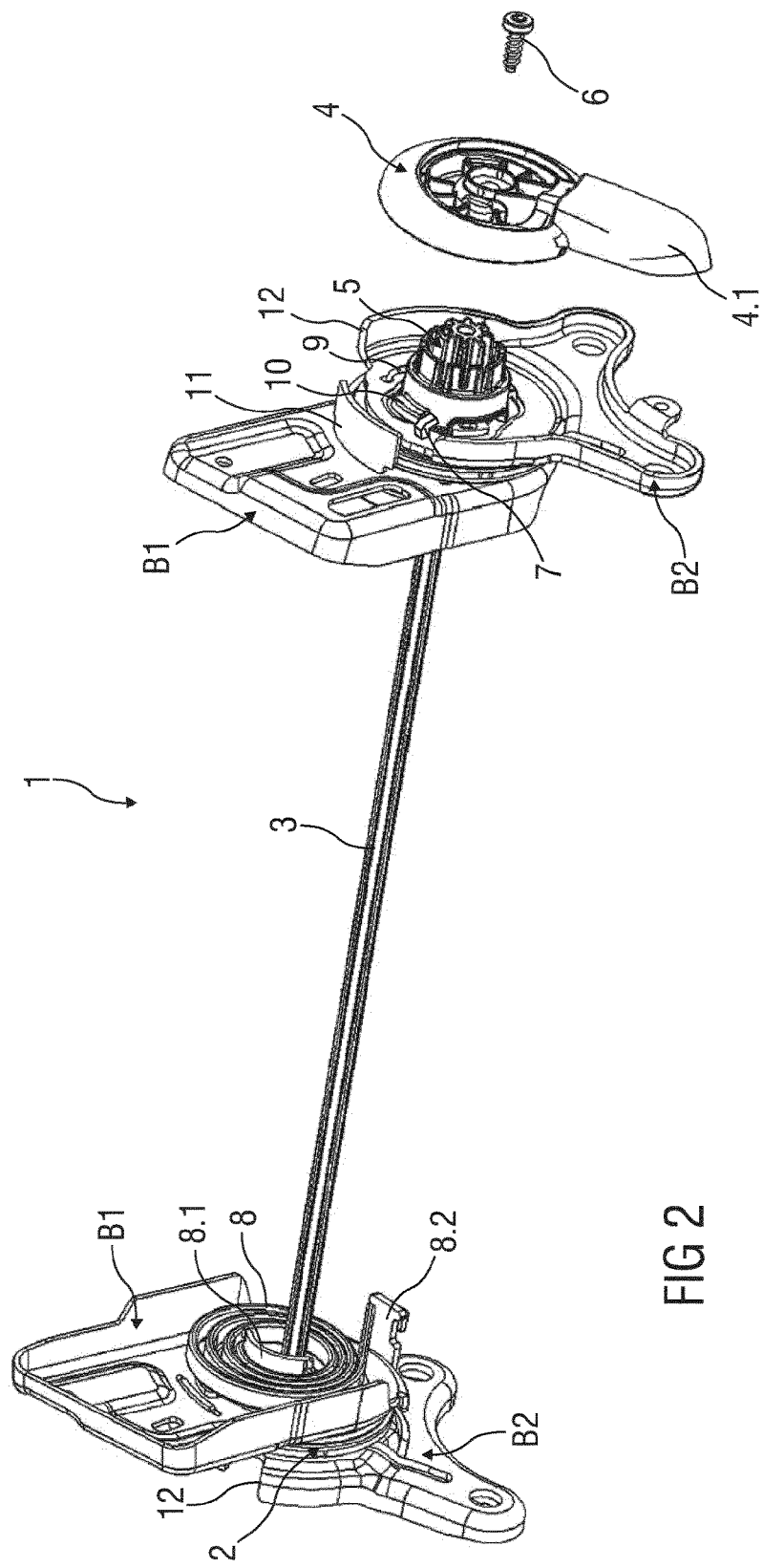
Figure 3:
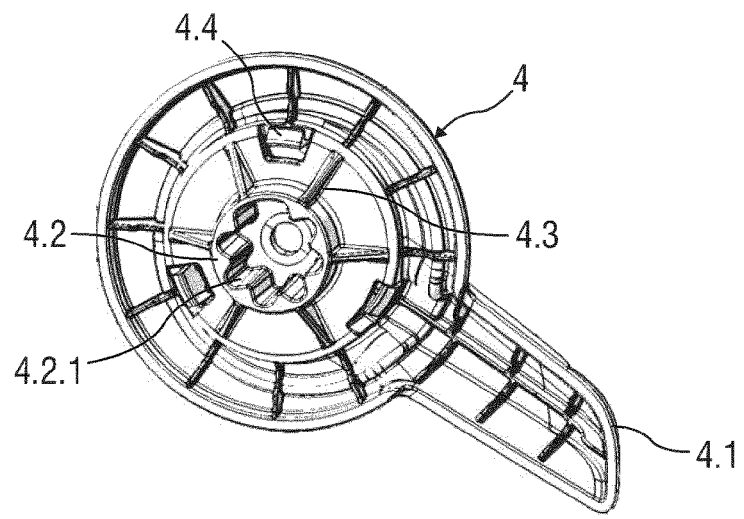
Figure 4A:
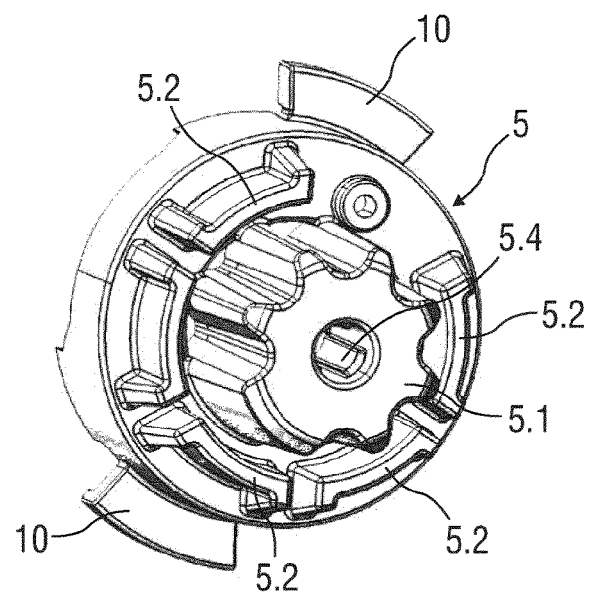
Figure 4B:
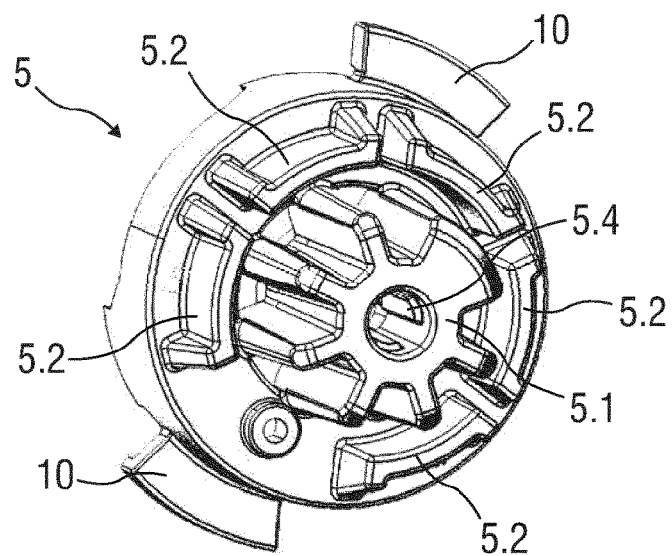
Figure 5:
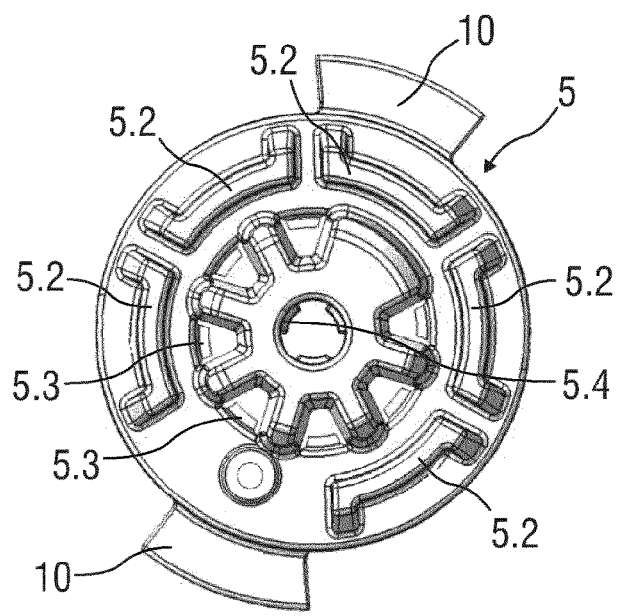
Figure 6:
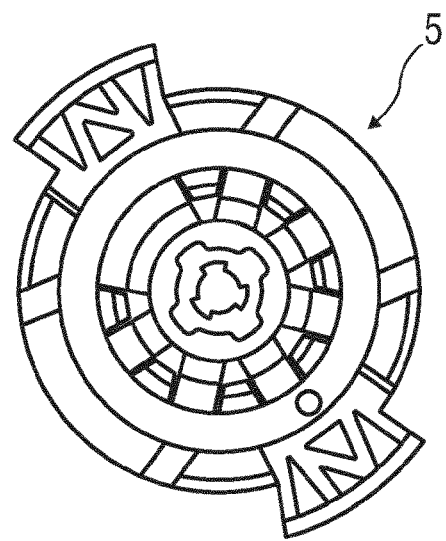
FIG. 6 is a plan view of the adapter 5 from the inner side according to FIG. 4B.
Figure 7:
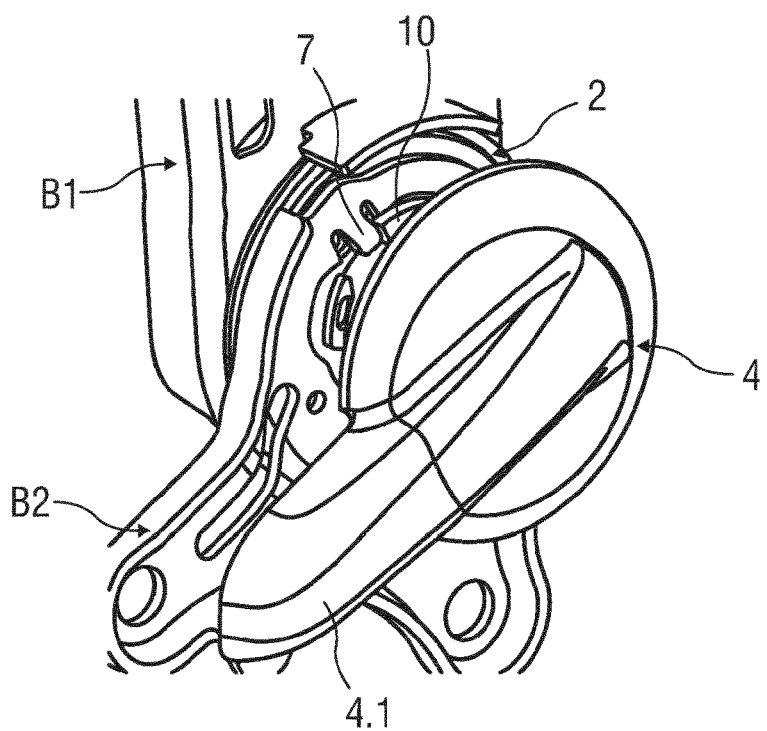
FIG. 7 is a schematic view of an embodiment of an assembled backrest adjuster 1 as a top view of the operating lever 4.

In place of the helical restoring spring 8 for the seat backrest as illustrated in the embodiment according to FIGS. 1 and 2, it is also possible to use as a restoring spring a torsion bar spring which is not illustrated in greater detail and which is accordingly articulated to the backrest adjuster 1 so as to be fixed to the seat member and the backrest.

LIST OF REFERENCE NUMERALS

1 Manually actuatable backrest adjuster
2 Fitting
B1 First fitting member
B2 Second fitting member
3 Transmission rod
4 Operating lever
4.1 Lever element
4.2 First formation
4.2.1. Recess
4.3 Ribs
4.4 First clip-fit elements
5 Adapter
5.1 Second formation
5.2 Circle segments
5.3 Second clip-fit elements
5.4 Receiving element
6 Securing means
7 Stop element
8 Restoring spring
9 Restoring element
10 Stop
11 Limit stop
12 Counter-stop

The invention claimed is:

1. A backrest adjuster for a vehicle seat, the backrest adjuster comprising:
    at least one upper fitting member;
    a lower fitting member;
    a fitting arranged between the at least one upper fitting member and the lower fitting member;
    a separate adapter positioned along a side of one of the upper fitting member or the lower fitting member that is facing away from the fitting, wherein the separate adapter is fixed to the fitting within a recess in the one of the upper fitting member or the lower fitting member; and
    an operating lever positioned along a side of the adapter that is facing away from the fitting in a form-fitting and/or force-fitting manner,
    wherein the adapter and the operating lever have mutually corresponding profiles, and
    wherein one of the mutually corresponding profiles of the adapter and the operating lever engages with an inside of the other of the mutually corresponding profiles of the adapter and the operating lever such that the mutually corresponding profiles rotationally secure the adapter and the operating lever to each other.

2. The backrest adjuster as claimed in claim 1, wherein the adapter has at least one radially protruding stop in which at least one corresponding fitting-side stop element of the fitting engages.

3. The backrest adjuster as claimed in claim 1, wherein the mutually corresponding profiles comprise ribs, webs, and/or sets of teeth which protrude at the surface side.

4. The backrest adjuster as claimed in claim 1, wherein the adapter and the operating lever each have at least one securing element which is constructed as one of a snap-fitting, a plug type, or a catch connection.

5. The backrest adjuster as claimed in claim 1, wherein the adapter and a transmission rod which connects two fittings are releasably connected to each other.

6. The backrest adjuster as claimed in claim 1, wherein the adapter is connected to the fitting in a form-fitting and/or force-fitting manner and a rotationally secure manner.

7. The backrest adjuster as claimed in claim 1, further comprising a restoring element which is constructed as a resilient element having a first resilient end, which is connected to the adapter, and having a second resilient end which is connected to the fitting.

8. The backrest adjuster as claimed in claim 1, further comprising a second fitting element comprising an upper fitting member, a lower fitting member and a fitting which is arranged therebetween and which is releasably and rotatably connected to the fitting through a transmission rod.

9. A vehicle seat having a backrest adjuster as claimed in claim 1.

* * * * *